(12) United States Patent (10) Patent No.: US 12,596,272 B2
Gao (45) Date of Patent: Apr. 7, 2026

(54) CORRESPONDENCE GENERATION METHOD, CONTROL METHOD, APPARATUS AND SYSTEM FOR MICRO RING MODULATOR

(71) Applicant: ZTE CORPORATION, Shenzhen (CN)

(72) Inventor: Yuqi Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 554 days.

(21) Appl. No.: 18/008,706

(22) PCT Filed: Jun. 11, 2021

(86) PCT No.: PCT/CN2021/099566
§ 371 (c)(1),
(2) Date: Dec. 7, 2022

(87) PCT Pub. No.: WO2021/254257
PCT Pub. Date: Dec. 23, 2021

(65) Prior Publication Data
US 2023/0341712 A1 Oct. 26, 2023

(30) Foreign Application Priority Data
Jun. 15, 2020 (CN) .......................... 202010542519.8

(51) Int. Cl.
*G02F 1/01* (2006.01)
(52) U.S. Cl.
CPC .......... *G02F 1/0147* (2013.01); *G02F 1/0121* (2013.01); *G02F 1/0113* (2021.01); *G02F 2203/21* (2013.01)

(58) Field of Classification Search
CPC .... G02F 1/0147; G02F 1/0121; G02F 1/0113; G02F 2203/21; G02F 1/025; H04B 10/516; H04B 10/0731
See application file for complete search history.

(56) References Cited

U.S. PATENT DOCUMENTS 9,954,618 B1 * 4/2018 Dong ................. H04B 10/5053
2012/0105177 A1 * 5/2012 McLaren .............. G02F 1/0147
333/17.1

(Continued)

FOREIGN PATENT DOCUMENTS

CN 102129133 A 7/2011

OTHER PUBLICATIONS

WIPO, International Search Report issued on Aug. 16, 2021.
(Continued)

*Primary Examiner* — Mariam Qureshi
(74) *Attorney, Agent, or Firm* — & Cai Intellectual Property (USA) Office

(57) ABSTRACT

The present disclosure provides a correspondence generation method for a micro-ring modulator, including: determining peak control parameter values of the micro-ring modulator at test temperatures, respectively, with each peak control parameter value being a value of a control parameter enabling modulation efficiency of the micro-ring modulator to reach a peak; and determining a correspondence between ambient temperatures of the micro-ring modulator and the peak control parameter values. The present disclosure further provides a control method for a micro-ring modulator, a control apparatus for a micro-ring modulator, a control system for a micro-ring modulator, and a computer-readable medium.

20 Claims, 6 Drawing Sheets

Determining peak control parameter values of the micro-ring modulator at test temperatures, respectively, with each peak control parameter value being a value of a control parameter enabling modulation efficiency of the micro-ring modulator to reach a peak — S100

Determining a correspondence between ambient temperatures of the micro-ring modulator and the peak control parameter values — S200

(56) References Cited

U.S. PATENT DOCUMENTS

2016/0357086 A1 * 12/2016 Jewart .................... G02B 6/125
2021/0057365 A1 * 2/2021 Kuo ........................ H01L 24/11
2021/0208470 A1 * 7/2021 Ram .................... G02F 1/2257

OTHER PUBLICATIONS

Kishore Padmaraju, et al. "Thermal stabilization of a microring modulator using feedback control," Optics Express, Dec. 17, 2012, vol. 20, No. 27.
Shuyu Yang, et al. "Thermal stabilization of a microring resonator using bandgap temperature sensor," 2015 IEEE.
Saurabh Agarwal, et al. "Wavelength Locking of a Si Ring Modulator Using an Integrated Drop-Port OMA Monitoring Circuit," IEEE Journal of Solid-State Circuits, vol. 51, No. 10, Oct. 2016.

* cited by examiner

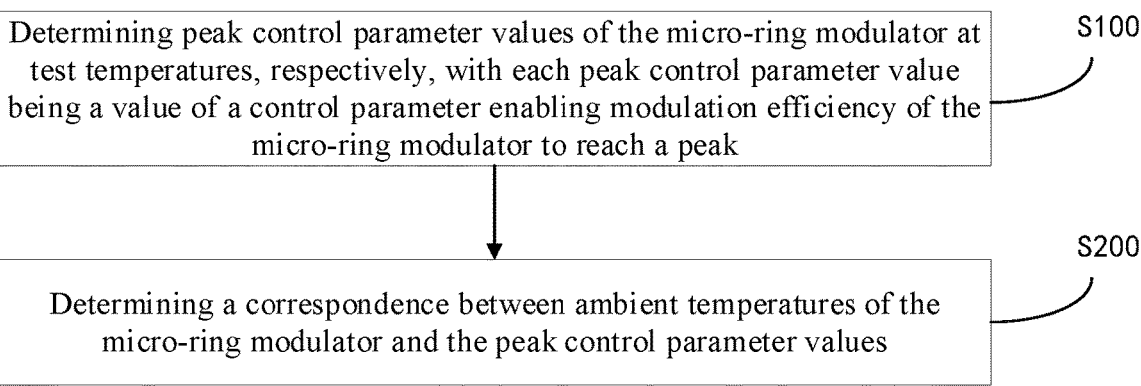

Determining peak control parameter values of the micro-ring modulator at test temperatures, respectively, with each peak control parameter value being a value of a control parameter enabling modulation efficiency of the micro-ring modulator to reach a peak    S100

Determining a correspondence between ambient temperatures of the micro-ring modulator and the peak control parameter values    S200

FIG. 1

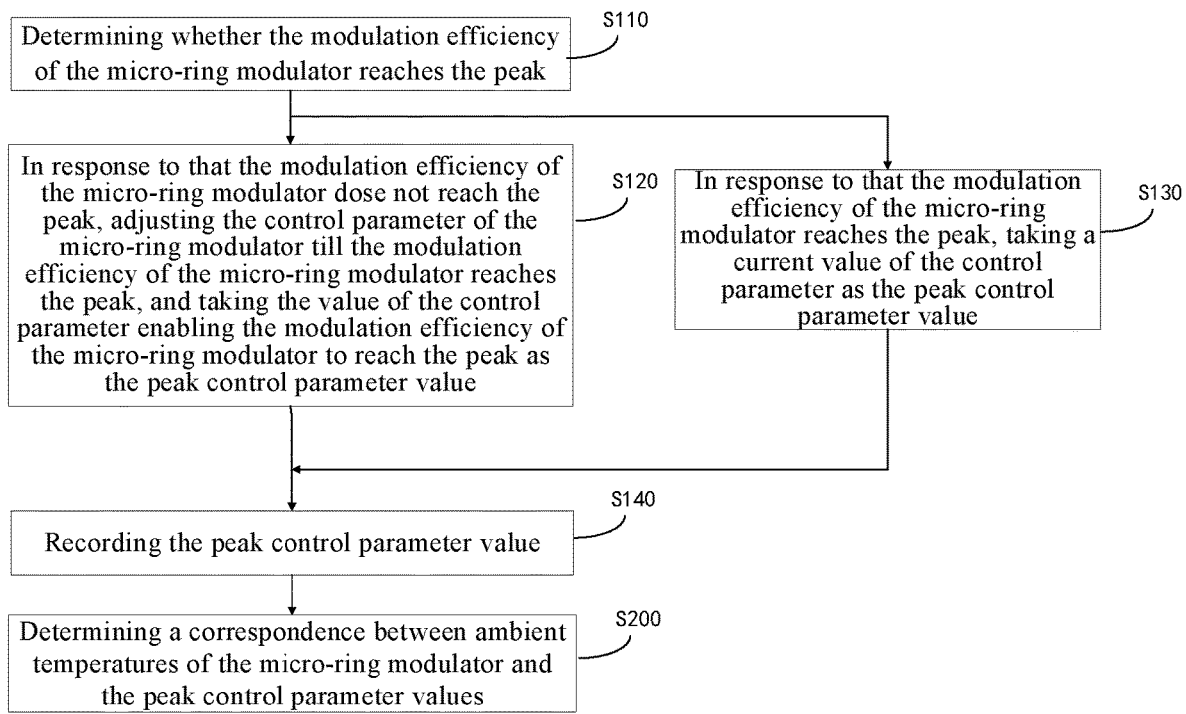

Determining whether the modulation efficiency of the micro-ring modulator reaches the peak   S110

In response to that the modulation efficiency of the micro-ring modulator dose not reach the peak, adjusting the control parameter of the micro-ring modulator till the modulation efficiency of the micro-ring modulator reaches the peak, and taking the value of the control parameter enabling the modulation efficiency of the micro-ring modulator to reach the peak as the peak control parameter value   S120

In response to that the modulation efficiency of the micro-ring modulator reaches the peak, taking a current value of the control parameter as the peak control parameter value   S130

Recording the peak control parameter value   S140

Determining a correspondence between ambient temperatures of the micro-ring modulator and the peak control parameter values   S200

FIG. 2

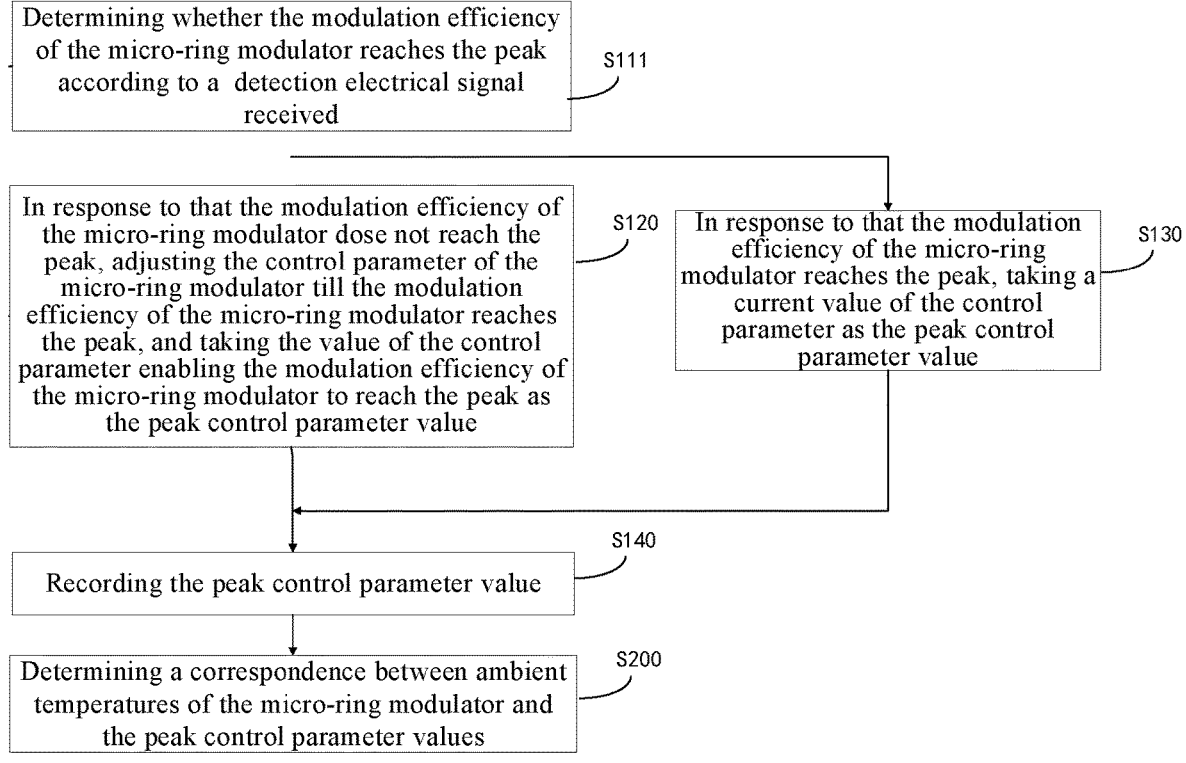

Determining whether the modulation efficiency of the micro-ring modulator reaches the peak according to a detection electrical signal received    S111

In response to that the modulation efficiency of the micro-ring modulator dose not reach the peak, adjusting the control parameter of the micro-ring modulator till the modulation efficiency of the micro-ring modulator reaches the peak, and taking the value of the control parameter enabling the modulation efficiency of the micro-ring modulator to reach the peak as the peak control parameter value    S120

In response to that the modulation efficiency of the micro-ring modulator reaches the peak, taking a current value of the control parameter as the peak control parameter value    S130

Recording the peak control parameter value    S140

Determining a correspondence between ambient temperatures of the micro-ring modulator and the peak control parameter values    S200

FIG. 3

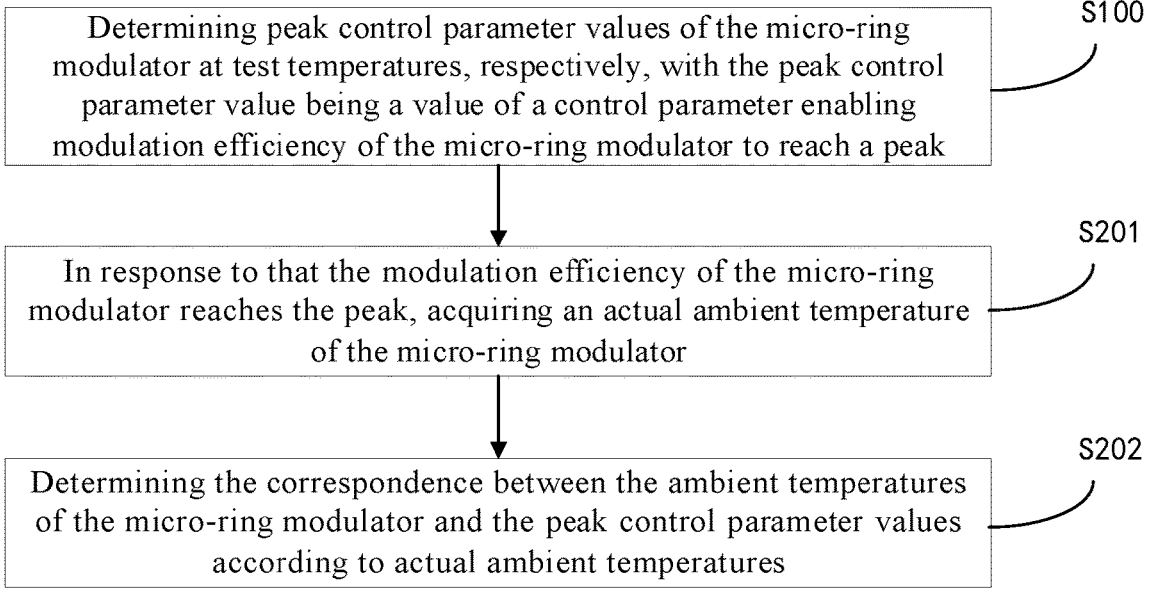

Determining peak control parameter values of the micro-ring modulator at test temperatures, respectively, with the peak control parameter value being a value of a control parameter enabling modulation efficiency of the micro-ring modulator to reach a peak    S100

In response to that the modulation efficiency of the micro-ring modulator reaches the peak, acquiring an actual ambient temperature of the micro-ring modulator    S201

Determining the correspondence between the ambient temperatures of the micro-ring modulator and the peak control parameter values according to actual ambient temperatures    S202

FIG. 4

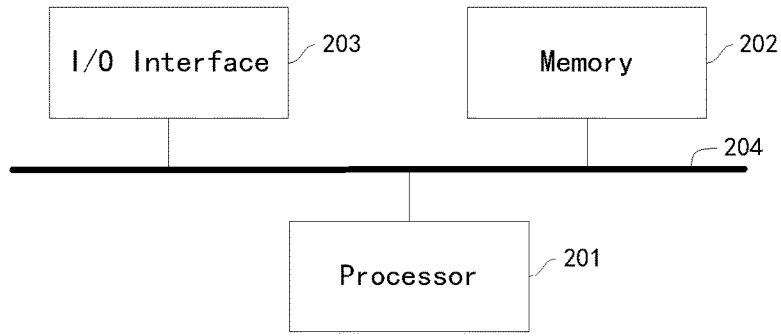
FIG. 7
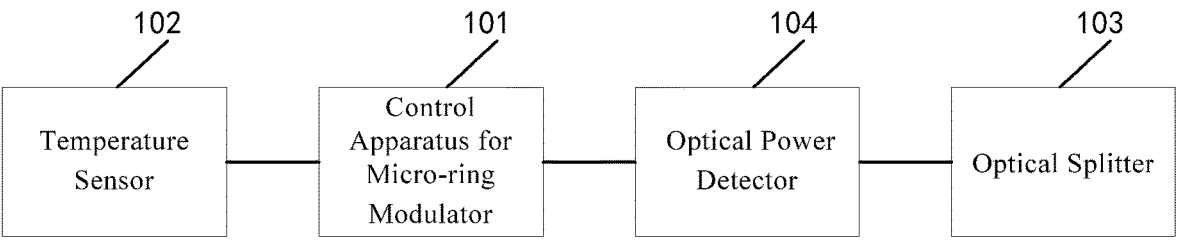
FIG. 8
Computer-readable
Medium
FIG. 9

CORRESPONDENCE GENERATION METHOD, CONTROL METHOD, APPARATUS AND SYSTEM FOR MICRO RING MODULATOR

CROSS-REFERENCE TO RELATED APPLICATIONS

The present application claims the priority of Chinese Patent Application No. 202010542519.8, filed on Jun. 15, 2020, the contents of which are incorporated herein in their entirety by reference.

TECHNICAL FIELD

The present disclosure relates to the field of communication technologies, and in particular, to a correspondence generation method for a micro-ring modulator, a control method for a micro-ring modulator, a control apparatus for a micro-ring modulator, a control system for a micro-ring modulator, and a computer-readable medium.

BACKGROUND

Silicon-based optoelectronic devices have achieved a great progress in recent years due to their advantages, such as being compatible with a complementary metal oxide semiconductor (CMOS), having a small size, having a good thermo-optic effect and a plasma dispersion effect, or the like. Silicon-based modulators can be applied in optical communication modules, and thus also have gained extensive research. Silicon-based Mach-Zehnder modulators and silicon-based micro-ring modulators all have achieved great development.

Compared with the Mach-Zehnder modulators, the micro-ring modulators have obvious advantages in power consumption and size. However, existing methods for stabilizing modulation efficiency of the micro-ring modulators are relatively inefficient.

SUMMARY

The present disclosure provides a correspondence generation method for a micro-ring modulator, a control method for a micro-ring modulator, a control apparatus for a micro-ring modulator, a control system for a micro-ring modulator, and a computer-readable medium.

In a first aspect, the present disclosure provides a correspondence generation method for a micro-ring modulator, including: determining peak control parameter values of the micro-ring modulator at test temperatures, respectively, with each peak control parameter value being a value of a control parameter enabling modulation efficiency of the micro-ring modulator to reach a peak; and determining a correspondence between ambient temperatures of the micro-ring modulator and the peak control parameter values.

In a second aspect, the present disclosure provides a control method for a micro-ring modulator, including: determining a current ambient temperature of at least one micro-ring modulator; and outputting a peak control parameter value of each micro-ring modulator corresponding to the current ambient temperature of the micro-ring modulator according to a pre-stored correspondence between ambient temperatures of each micro-ring modulator and peak control parameter values of the micro-ring modulator, so as to control modulation efficiency of the micro-ring modulator to reach a peak, with each peak control parameter value being a value of a control parameter enabling the modulation efficiency of the micro-ring modulator to reach the peak.

In a third aspect, the present disclosure provides a control apparatus for a micro-ring modulator, including: a memory having an executable program stored thereon; at least one processor configured to call the executable program to perform at least one of the method in the first aspect or the method in the second aspect; and at least one I/O interface connected between the processor and the memory, and configured to implement information interaction between the processor and the memory.

In a fourth aspect, the present disclosure provides a control system for a micro-ring modulator, including: the control apparatus for a micro-ring modulator in the third aspect; and a temperature sensor configured to acquire a current ambient temperature of at least one micro-ring modulator under a control of the control apparatus.

In a fifth aspect, the present disclosure provides a computer-readable medium having an executable program stored therein, the executable program, when executed, performs at least one of the method in the first aspect or the method in the second aspect.

BRIEF DESCRIPTION OF DRAWINGS

FIG. 1 is a flowchart of a correspondence generation method for a micro-ring modulator according to the present disclosure;

FIG. 2 is a flowchart of a part of operations of a correspondence generation method for a micro-ring modulator according to the present disclosure;

FIG. 3 is a flowchart of a part of operations of a correspondence generation method for a micro-ring modulator according to the present disclosure;

FIG. 4 is a flowchart of a part of operations of a correspondence generation method for a micro-ring modulator according to the present disclosure;

FIG. 7 is a block diagram of a control apparatus for a micro-ring modulator according to the present disclosure;

FIG. 8 is a block diagram of a control system for a micro-ring modulator according to the present disclosure;

FIG. 9 is a schematic diagram of a computer-readable medium according to the present disclosure;

DETAIL DESCRIPTION OF EMBODIMENTS

Figure 5:
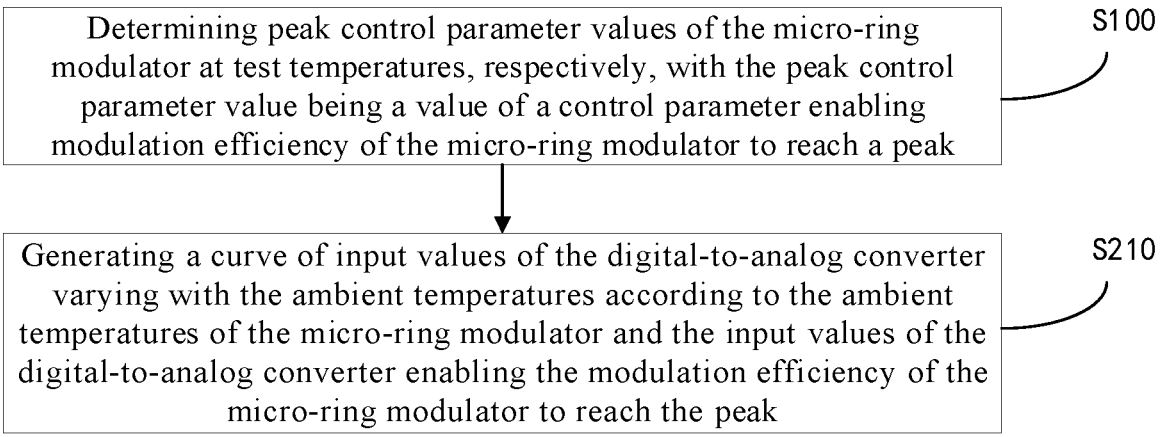
FIG. 5 is a flowchart of a part of operations of a correspondence generation method for a micro-ring modulator according to the present disclosure.

In order to make those skilled in the art better understand technical solutions of the present disclosure, a correspondence generation method for a micro-ring modulator, a control method for a micro-ring modulator, a control apparatus for a micro-ring modulator, a control system for a micro-ring modulator, and a computer-readable medium provided in the present disclosure are further described in detail below with reference to the accompanying drawings.

Exemplary embodiments are described in detail below with reference to the accompanying drawings, but the exemplary embodiments may be embodied in different forms, and should not be interpreted as limiting the present disclosure. The embodiments are provided for making the present disclosure more thorough and complete, and for those skilled in the art fully understanding the scope of the present disclosure.

The embodiments of the present disclosure and technical features in the embodiments may be combined with each other if no conflict is incurred.

As used herein, a term "and/or" includes any and all combinations of one or more of listed items.

The terms used in the present disclosure are for a purpose of describing particular embodiments only, and are not intended to limit the present disclosure. As used in the present disclosure, singular forms "a" and "the" are intended to include plural forms as well, i.e., to represent at least one, unless the context clearly defines otherwise. It should further be understood that terms "includes" and/or "made of" in the present disclosure are used to specify a presence of at least one of recited features, integers, steps, operations, elements or components, but do not preclude a presence or an addition of at least one of other features, integers, steps, operations, elements, components or groups thereof.

Unless otherwise defined, meanings of all terms (including technical terms and scientific terms) used herein are same as meanings commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Through researches, is found that a micro-ring modulator is a wavelength-sensitive device, and modulation efficiency of the micro-ring modulator would be influenced by a change of an ambient temperature of the micro-ring modulator.

In a first aspect, the present disclosure provides a correspondence generation method for a micro-ring modulator, and as shown in FIG. 1, the correspondence generation method includes operations S100 and S200.

At operation S100, determining peak control parameter values of the micro-ring modulator at test temperatures, respectively, with each peak control parameter value being a value of a control parameter enabling modulation efficiency of the micro-ring modulator to reach a peak.

At operation S200, determining a correspondence between ambient temperatures of the micro-ring modulator and the peak control parameter values.

In the present disclosure, a control apparatus for the micro-ring modulator controls the modulation efficiency of the micro-ring modulator by outputting the control parameter to the micro-ring modulator; if the modulation efficiency of the micro-ring modulator is reduced due to a change of the ambient temperature of the micro-ring modulator, the modulation efficiency of the micro-ring modulator can return to a maximum value by adjusting a value of the control parameter outputted.

In some implementations, the control parameter is a temperature control parameter for controlling a temperature of the micro-ring modulator. The control apparatus can stabilize the modulation efficiency of the micro-ring modulator by adjusting the temperature of the micro-ring modulator.

In the present disclosure, it should be noted that, a peak of the modulation efficiency of the micro-ring modulator refers to a maximum value of the modulation efficiency of the micro-ring modulator. Manners for obtaining the peak are not limited in the present disclosure. For example, a theoretical maximum value (i.e., a theoretical peak) that the modulation efficiency of the micro-ring modulator can reach may be regarded as the peak, and if the modulation efficiency of the micro-ring modulator reaches the theoretical peak, the modulation efficiency of the micro-ring modulator is determined to reach the peak; the peak may also be determined by a dynamic adjustment manner, i.e., during the value of the control parameter being continuously adjusted, the modulation efficiency of the micro-ring modulator is detected, and a maximum value that the modulation efficiency of the micro-ring modulator can reach during an adjustment process of adjusting the value of the control parameter is regarded as the peak.

In the present disclosure, the correspondence, between the ambient temperatures of the micro-ring modulator and the peak control parameter values, determined by operations S100 and S200 is pre-stored in the control apparatus for the micro-ring modulator. If the ambient temperature of the micro-ring modulator changes, the modulation efficiency of the micro-ring modulator is to be stabilized through the correspondence pre-stored.

It should be noted that, in operation S100, the more different test temperatures are selected, the smaller each interval between the test temperatures selected, for the control apparatus controlling the modulation efficiency of the micro-ring modulator according to the correspondence pre-stored, the higher an accuracy of the controlling is, and the more stable the modulation efficiency of the micro-ring modulator is.

It should be noted that, if one control apparatus controls a plurality of micro-ring modulators, the correspondence of each micro-ring modulator may be generated through operations S100 and S200. In addition, in a case where consistency of the micro-ring modulators is good, the correspondence of one micro-ring modulator generated through operations S100 and S200 may be used for the plurality of micro-ring modulators, which is conducive for mass production of micro-ring modulators.

It should further be noted that, in the present disclosure, the correspondence between the ambient temperatures of the micro-ring modulator and values of the control parameter enabling the modulation efficiency of the micro-ring modulator to reach the peak is generated by operations S100 and S200, and is pre-stored in the control apparatus for the micro-ring modulator, if the ambient temperature of the micro-ring modulator changes, the modulation efficiency of the micro-ring modulator is to be stabilized through the correspondence pre-stored. A calculation process for calculating the value of the control parameter enabling the modulation efficiency of the micro-ring modulator to reach the maximum value by using parameters such as temperatures is omitted, so that a reaction speed of the control apparatus is improved; in addition, a size of the micro-ring modulator is relatively small, an internal temperature of the micro-ring modulator is difficult to be detected, and the temperature of the micro-ring modulator is desired to be detected by detecting values of other variables related to the temperature of the micro-ring modulator, and in the present disclosure, the correspondence between the ambient temperatures and the peak control parameter values is generated, the value of the control parameter can be accordingly determined by obtaining the ambient temperature, so that a process of calculating or determining a change of the temperature of the micro-ring modulator through other variables related to the temperature of the micro-ring modulator is omitted, the reaction speed of the control apparatus is further improved, and a stability of the modulation efficiency of the micro-ring modulator is improved.

In the correspondence generation method for the micro-ring modulator provided in the present disclosure, the values of the control parameter enabling the modulation efficiency of the micro-ring modulator to reach the maximum value at the test temperatures are determined, the correspondence between the ambient temperatures of the micro-ring modulator and the values of the control parameter enabling the modulation efficiency of the micro-ring modulator to reach the maximum value is generated. After the correspondence is pre-stored in the control apparatus for the micro-ring modulator, the control apparatus can determine the value of the control parameter accordingly by obtaining the ambient temperature of the micro-ring modulator to control the modulation efficiency of the micro-ring modulator, and thus the reaction speed of the control apparatus is improved, the stability of the modulation efficiency of the micro-ring modulator is improved. In addition, in a case where consistency of micro-ring modulators is good, the correspondence generated by the correspondence generation method provided in the present disclosure may be applied to mass production of the micro-ring modulators.

In some implementations, referring to FIG. 2, the operation S100, i.e., for any test temperature, determining the peak control parameter value of the micro-ring modulator at a current test temperature, includes operations S110 and S120.

At operation S110, determining whether the modulation efficiency of the micro-ring modulator reaches the peak.

At operation S120, in response to that the modulation efficiency of the micro-ring modulator dose not reach the peak, adjusting the control parameter of the micro-ring modulator till the modulation efficiency of the micro-ring modulator reaches the peak, and taking the value of the control parameter enabling the modulation efficiency of the micro-ring modulator to reach the peak as the peak control parameter value.

In some implementations, referring to FIG. 2, in operation S100, after operation S110, the correspondence generation method may further include operation S130.

At operation S130, in response to that the modulation efficiency of the micro-ring modulator reaches the peak, taking a current value of the control parameter as the peak control parameter value.

Accordingly, referring to FIG. 2, in some implementations, operation S100 may further include operation S140.

At operation S140, recording the peak control parameter value.

In some implementations, referring to FIG. 3, operation S110 may include operation S111.

At operation S111, determining whether the modulation efficiency of the micro-ring modulator reaches the peak according to a detection electrical signal received.

In the present disclosure, an optical splitter is used to split an output optical signal modulated by the micro-ring modulator to obtain a detection optical signal, and then an optical power detector (PD) is used to detect power of the output optical signal through the detection optical signal to obtain the detection electrical signal in operation S111.

In some implementations, the optical splitter splits the output optical signal at any splitting ratio in a range from 1:8 to 1:10, and uses a low-power optical signal obtained as the detection optical signal. In some implementations, the output optical signal may be split according to a splitting ratio of 1:9.

In the present disclosure, a heating resistor is embedded in the micro-ring modulator, and the control apparatus controls the heating resistor to regulate the temperature of the micro-ring modulator by controlling an input value of a digital-to-analog converter (DAC) to control an output value of the DAC, so as to control the modulation efficiency of the micro-ring modulator. Accordingly, the control parameter in operation S100 may be a parameter for controlling the heating resistor.

In some implementations, the control apparatus for the micro-ring modulator can obtain actual ambient temperatures of each micro-ring modulator, and generate the correspondence between the ambient temperatures of the micro-ring modulator and the peak control parameter values according to the actual ambient temperatures, so as to further improve the accuracy of the controlling and improve the stability of the modulation efficiency of the micro-ring modulator. In some implementations, each micro-ring modulator is provided with a temperature sensor, and the control apparatus reads the actual ambient temperatures of each micro-ring modulator by the temperature sensor.

Accordingly, referring to FIG. 4, operation S200 may include operations S201 and S202.

At operation S201, in response to that the modulation efficiency of the micro-ring modulator reaches the peak, acquiring an actual ambient temperature of the micro-ring modulator.

At operation S202, determining the correspondence between the ambient temperatures of the micro-ring modulator and the peak control parameter values according to actual ambient temperatures.

In some implementations, the control apparatus controls the heating resistor to regulate the temperature of the micro-ring modulator by controlling an input value of the DAC to control an output value of the DAC, the peak control parameter value is the input value of the DAC enabling the modulation efficiency of the micro-ring modulator to reach the peak.

In some implementations, the correspondence between the ambient temperatures of the micro-ring modulator and the peak control parameter values stored in the control apparatus is a curve of a mapping relationship between ambient temperatures and input values of the DAC enabling the modulation efficiency of the micro-ring modulator to reach the peak.

Accordingly, referring to FIG. 5, operation S200 includes operation S210.

At operation S210, generating a curve of the input values of the digital-to-analog converter (DAC) varying with the ambient temperatures according to the ambient temperatures of the micro-ring modulator and the input values of the digital-to-analog converter enabling the modulation efficiency of the micro-ring modulator to reach the peak.

Figure 6:
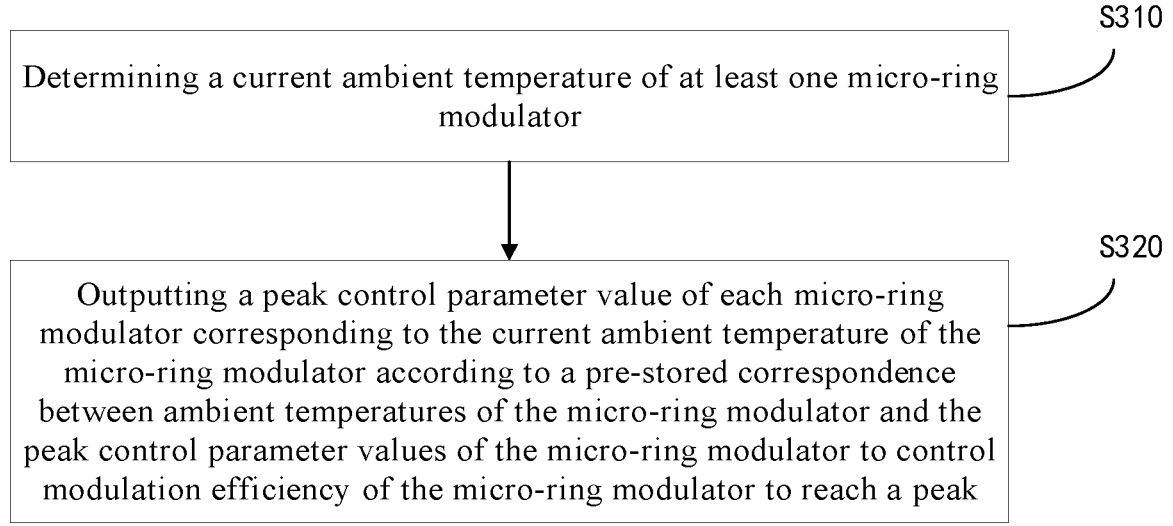
FIG. 6 is a flowchart of a control method for a micro-ring modulator according to the present disclosure.

In a second aspect, the present disclosure provides a control method for a micro-ring modulator, and as shown in FIG. 6, the control method includes operations S310 and S320.

At operation S310, determining a current ambient temperature of at least one micro-ring modulator.

At operation S320, outputting a peak control parameter value of each micro-ring modulator corresponding to the current ambient temperature of the micro-ring modulator according to a pre-stored correspondence between ambient temperatures of the micro-ring modulator and peak control parameter values of the micro-ring modulator, so as to control modulation efficiency of the micro-ring modulator to reach a peak, with each peak control parameter value being a value of a control parameter enabling the modulation efficiency of the micro-ring modulator to reach the peak.

In some implementations, the peak control parameter value includes an input value of the DAC enabling the modulation efficiency of the micro-ring modulator to reach the peak.

In some implementations, for each micro-ring modulator, the correspondence between the ambient temperatures of the micro-ring modulator and the peak control parameter values includes a curve of the input values, varying with the ambient temperature, of the digital-to-analog converter (DAC) enabling the modulation efficiency of the micro-ring modulator to reach the peak.

In the control method for the micro-ring modulator provided in the present disclosure, a control apparatus for the micro-ring modulator pre-stores the correspondence between the ambient temperatures and values of the control parameter enabling the modulation efficiency of the micro-ring modulator to reach a maximum value, and determines the value of the control parameter accordingly by acquiring the ambient temperature of the micro-ring modulator to control the modulation efficiency of the micro-ring modulator, so as to improve the reaction speed of the control apparatus, and improve the stability of the modulation efficiency of the micro-ring modulator.

In a third aspect, the present disclosure provides a control apparatus for a micro-ring modulator, and as shown in FIG. 7, the control apparatus includes: at least one processor 201; a memory 202 configured to store at least one program, the at least one program, when executed by the at least one processor 201, causes the at least one processor 201 to perform at least one of the correspondence generation method for the micro-ring modulator described above or the control method for the micro-ring modulator described above; and at least one I/O interface 203, connected between the processor 201 and the memory 202, and configured to implement information interaction between the processor 201 and the memory 202.

In the present disclosure, the processor 201 is a device having a capability of processing data, and includes, but is not limited to, a Central Processing Unit (CPU), and the like; the memory 202 is a device having a capability of storing data, and includes, but is not limited to, a random access memory (RAM, in particular, SDRAM, DDR, and the like), a read only memory (ROM), an electrically erasable programmable read only memory (EEPROM), and a FLASH; and the I/O interface 103 is connected between the processor 201 and the memory 202, is configured to implement information interaction between the processor 201 and the memory 202, and includes, but is not limited to, a bus and the like.

In some implementations, the processor 201, the memory 202 and the I/O interface 203 are connected together through a bus 204, and are further connected to other components of a computing device.

The correspondence generation method for the micro-ring modulator and the control method for the micro-ring modulator have been described in detail above, and thus are not repeated here.

In a fourth aspect, the present disclosure provides a control system for a micro-ring modulator, and as shown in FIG. 8, the control system includes a control apparatus 101 for a micro-ring modulator and a temperature sensor 102.

The control apparatus 101 for the micro-ring modulator is the control apparatus for the micro-ring modulator described in the third aspect of the present disclosure.

The temperature sensor 102 is configured to acquire a current ambient temperature of at least one micro-ring modulator under a control of the control apparatus 101.

In some implementations, the control system further includes an optical splitter 103 and an optical power detector 104.

The optical splitter 103 is configured to split an output optical signal modulated by the micro-ring modulator to obtain a detection optical signal.

The optical power detector 104 is configured to detect power of the output optical signal through the detection optical signal to obtain a detection electrical signal, and input the detection electrical signal to the control apparatus 101.

In the present disclosure, the control apparatus in the control system pre-stores the correspondence between the ambient temperatures and values of the control parameter enabling the modulation efficiency of the micro-ring modulator to reach a maximum value, and the control system can determine the value of the control parameter accordingly by acquiring the ambient temperature of the micro-ring modulator according to the correspondence pre-stored, to control the modulation efficiency of the micro-ring modulator, so as to improve the reaction speed of the control apparatus, and improve the stability of the modulation efficiency of the micro-ring modulator. In addition, in a case where consistency of micro-ring modulators is good, the control system is conducive for mass production of micro-ring modulators.

In a fifth aspect, referring to FIG. 9, the present disclosure provides a computer-readable medium having a computer program stored therein, the computer program, when executed by a processor, performs at least one of the correspondence generation method for the micro-ring modulator or the control method for the micro-ring modulator described above.

The correspondence generation method for the micro-ring modulator and the control method for the micro-ring modulator have been described in detail above, and thus are not repeated here.

In order to make those skilled in the art more clearly understand the technical solutions of the present disclosure, the technical solutions of the present disclosure are described in detail below by specific examples.

First Example

Figure 10:
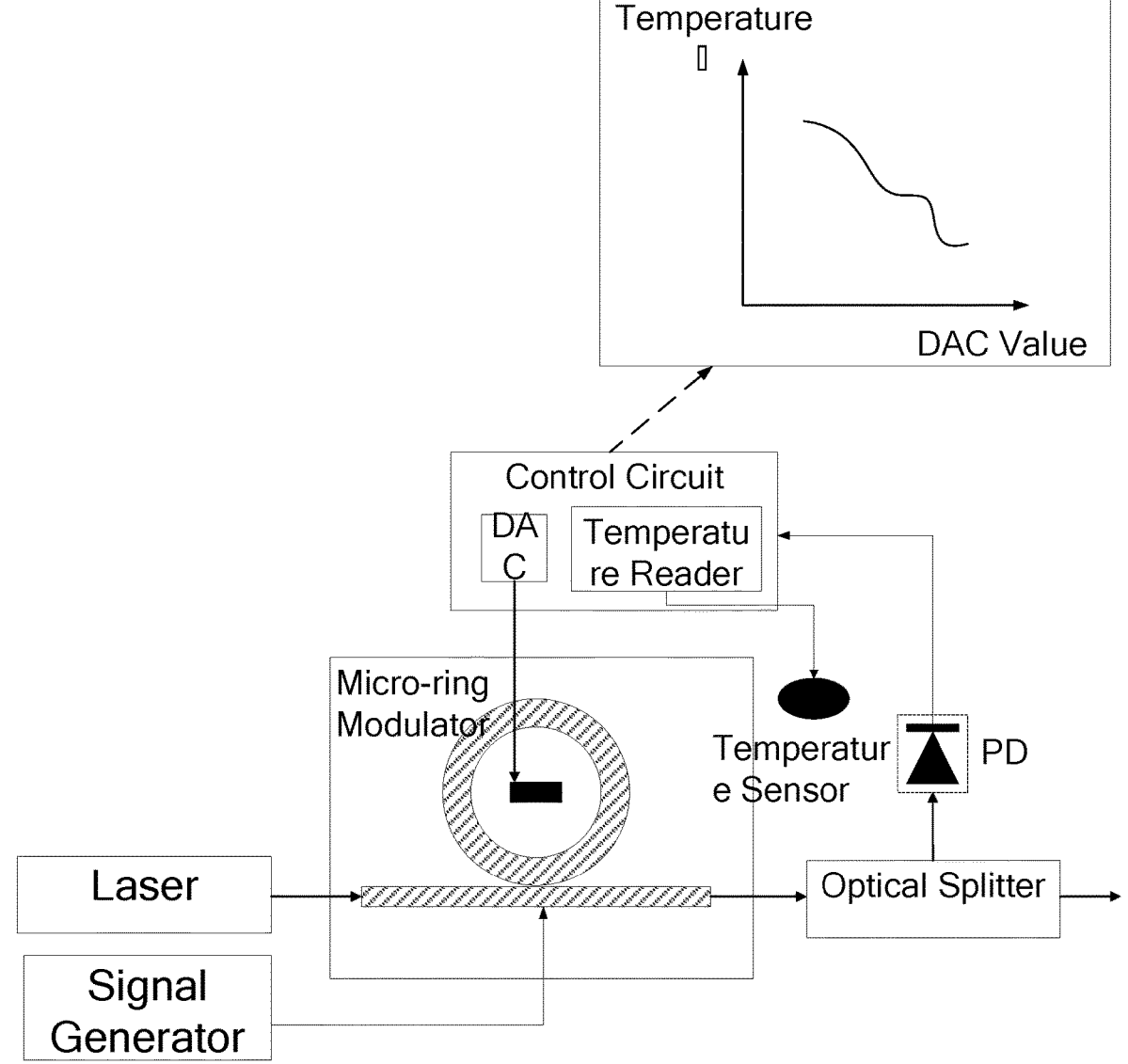
FIG. 10 is a schematic diagram of an example of a control system for a micro-ring modulator according to the present disclosure.

FIG. 10 is a schematic diagram of a first example of a control system for a micro-ring modulator according to the present disclosure.

In FIG. 10, the control apparatus for the micro-ring modulator provided in the present disclosure is shown by a control circuit, the control circuit, a temperature sensor, a PD and an optical splitter form the control system for the micro-ring modulator.

In the control system shown in FIG. 10, a laser inputs an optical signal to the micro-ring modulator, a signal generator generates a modulating electrical signal, the modulating electrical signal is loaded into the micro-ring modulator, and the micro-ring modulator modulates the optical signal input to obtain an output optical signal. The optical splitter splits the output optical signal modulated by the micro-ring modulator to obtain a detection optical signal; and the PD detects power of the output optical signal through the detection optical signal to obtain a detection electrical signal. In the first example, the detection electrical signal output by the PD is an output voltage, and a good linear correspondence exists between the output voltage of the PD and an optical power of the optical signal input. The control circuit determines whether the modulation efficiency of the micro-ring modulator reaches a peak according to the detection electrical signal.

In the first example, the optical splitter splits the output optical signal at any splitting ratio in a range from 1:8 to 1:10, and takes a low-power optical signal obtained as the detection optical signal. For example, in the first example, the optical splitter splits the output optical signal at a splitting ratio of 1:9.

Second Example

Figure 11:
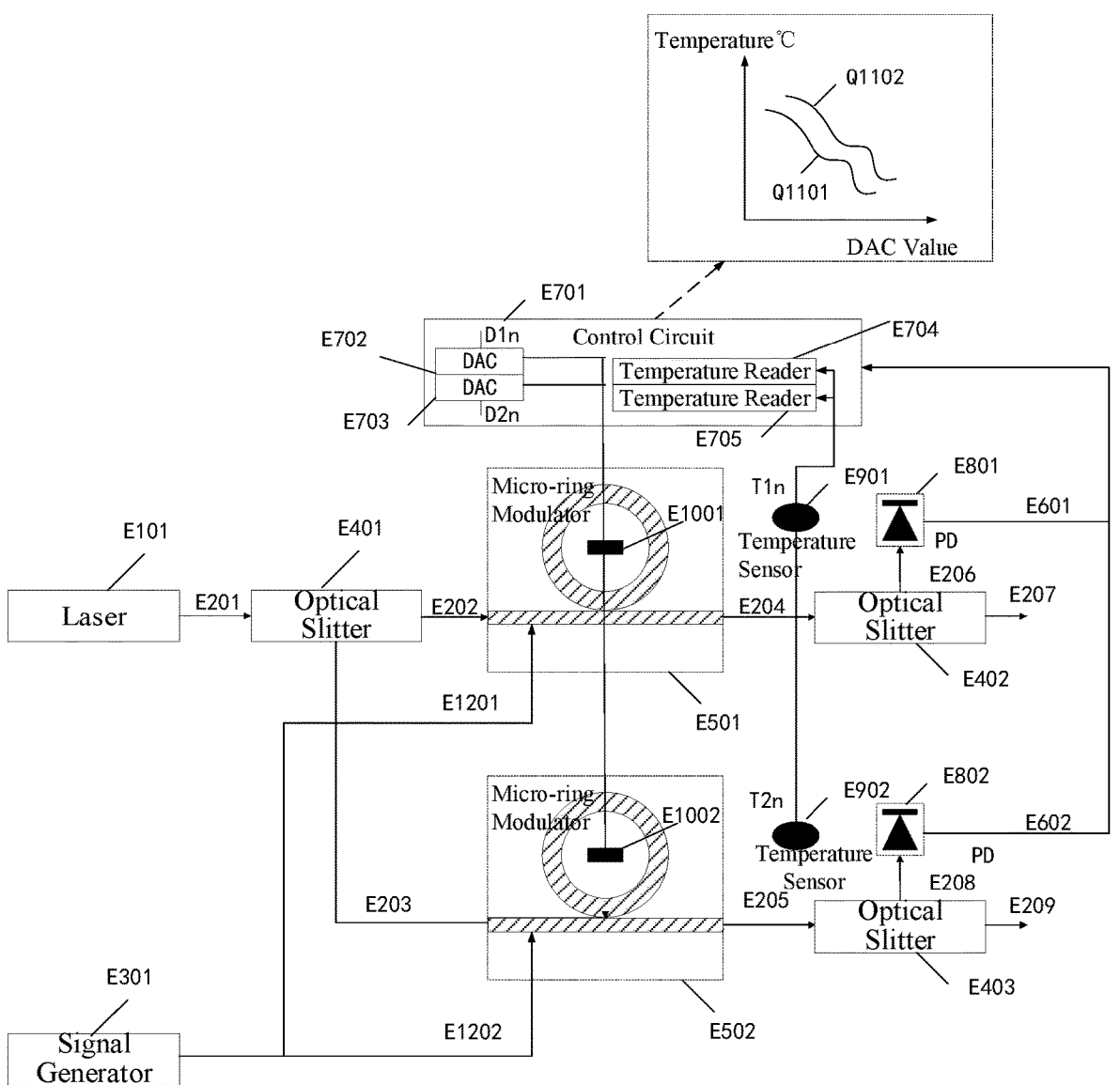
FIG. 11 is a schematic diagram of an example of a control system for a micro-ring modulator according to the present disclosure.

FIG. 11 is a schematic diagram of a second example of a control system for a micro-ring modulator according to the present disclosure. In FIG. 11, a control circuit E701 controls micro-ring modulators E501 and E502 simultaneously.

In FIG. 11, the control circuit E701 is the control apparatus for the micro-ring modulator provided in the present disclosure, the control circuit E701, temperature sensors E901 and E902, PDs E801 and E802, and optical splitters E402 and E403 form the control system for the micro-ring modulator.

A wavelength-tunable laser E101 outputs a laser signal E201, which is split into two optical signals E202 and E203 with a same optical power by a splitter E401 with a splitting ratio of 1:1, and the two optical signals are input to the micro-ring modulators E501 and E502, respectively.

Modulating electrical signals E1201 and E1202 are generated by a signal generator E301 and loaded into the micro-ring modulators E501 and E502, respectively.

The micro-ring modulators E501 and E502 modulates the optical signals E202 and E203 input to obtain output optical signals E204 and E205.

The output optical signals E204 and E205 are split into low-power optical signals E206 and E208 and large-power optical signals E207 and E209 by the splitters E402 and E403 with a splitting ratio of 1:9, respectively.

The low-power optical signals E206 and E208 are used as detection optical signals and form feedback signals E601 and E602 through the PDs E801 and E802, the feedback signals E601 and E602 are fed back to the control circuit E701, and based on the feedback signals E601 and E602, the control circuit E701 adjusts output values of DACs E702 and E703 by respectively adjusting input values D11 and D21 of the DACs E702 and E703, the output values of the DACs are respectively output to resistors E1001 and E1002 built in the micro-ring modulators E501 and E502 to regulate temperatures of the micro-ring modulators E501 and E502, so as to enable modulation efficiencies of the micro-ring modulators E501 and E502 to be maximum.

Temperature readers E704 and E705 of the control circuit E701 record current ambient temperatures T11 and T21 through the temperature sensors E901 and E902, respectively.

As the ambient temperature changes, the above operations are repeated, ambient temperatures T12 and T22, and corresponding input values D12 and D22 of the DACs enabling the modulation efficiencies of the micro-ring modulators E501 and E502 to be maximum are read.

By analogy, as the ambient temperature changes, the above operations are repeated, ambient temperatures T1$n$ and T2$n$, and corresponding input values D1$n$ and D2$n$ of the DACs enabling the modulation efficiencies of the micro-ring modulators E501 and E502 to be maximum are read, curves Q1101 and Q1102 of input values of the DACs of the micro-ring modulators E501 and E502 varying with the ambient temperatures are generated, and are pre-stored in a memory of the control circuit E701, so as to control the micro-ring modulators E501 and E502 respectively according to the curves Q1101 and Q1102, to enable the modulation efficiencies of the micro-ring modulators E501 and E502 to be maximum.

It should be noted that, in the second example, although only a case where the control circuit E701 controls the two micro-ring modulators E501 and E502 simultaneously is disclosed, the present disclosure is not limited to the case where the control circuit E701 controls the two micro-ring modulators E501 and E502 simultaneously, for example, the control circuit may control four or more micro-ring modulators simultaneously, but the number of the micro-ring modulators to be controlled by the control circuit is not limited in the present disclosure.

It should be understood by those of ordinary skill in the art that all or some of operations in the method, functional modules/components in the apparatus disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software to be executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EE-PROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A correspondence generation method for a micro-ring modulator, comprising:

determining peak control parameter values of the micro-ring modulator at test temperatures, respectively, with each peak control parameter value being a value of a control parameter enabling modulation efficiency of the micro-ring modulator to reach a peak, and the control parameter being a temperature control parameter for controlling a temperature of the micro-ring modulator;

determining a correspondence between ambient temperatures of the micro-ring modulator and the peak control parameter values; and storing the correspondence between the ambient temperatures of the micro-ring modulator and the peak control parameter values in a control apparatus for the micro-ring modulator.

2. The method of claim 1, wherein for any one of the test temperatures, determining the peak control parameter value of the micro-ring modulator at a current test temperature comprises:

determining whether the modulation efficiency of the micro-ring modulator reaches the peak; and in response to that the modulation efficiency of the micro-ring modulator dose not reach the peak, adjusting the control parameter of the micro-ring modulator till the modulation efficiency of the micro-ring modulator reaches the peak, and taking the value of the control parameter enabling the modulation efficiency of the micro-ring modulator to reach the peak as the peak control parameter value.

3. The method of claim 2, further comprising:

after determining whether the modulation efficiency of the micro-ring modulator reaches the peak, in response to that the modulation efficiency of the micro-ring modulator reaches the peak, taking a current value of the control parameter as the peak control parameter value.

4. The method of claim 2, wherein, for any one of the test temperatures, the determining the peak control parameter value of the micro-ring modulator at a current temperature further comprises:

recording the peak control parameter value.

5. The method of claim 2, wherein the determining whether the modulation efficiency of the micro-ring modulator reaches the peak comprises:

determining whether the modulation efficiency of the micro-ring modulator reaches the peak according to a detection electrical signal received;

wherein the detection electrical signal is generated by:

splitting an output optical signal modulated by the micro-ring modulator to obtain a detection optical signal; and detecting power of the output optical signal through the detection optical signal to obtain the detection electrical signal.

6. The method of claim 2, wherein the determining a correspondence between ambient temperatures of the micro-ring modulator and the peak control parameter values comprises:

in response to that the modulation efficiency of the micro-ring modulator reaches the peak, acquiring an actual ambient temperature of the micro-ring modulator; and determining the correspondence between the ambient temperatures of the micro-ring modulator and the peak control parameter values according to actual ambient temperatures.

7. The method of claim 2, wherein the control parameter comprises an input value of a digital-to-analog converter, the peak control parameter value comprises the input value of the digital-to-analog converter enabling the modulation efficiency of the micro-ring modulator to reach the peak.

8. The method of claim 1, wherein the determining a correspondence between ambient temperatures of the micro-ring modulator and the peak control parameter values comprises:

in response to that the modulation efficiency of the micro-ring modulator reaches the peak, acquiring an actual ambient temperature of the micro-ring modulator; and determining the correspondence between the ambient temperatures of the micro-ring modulator and the peak control parameter values according to actual ambient temperatures.

9. The method of claim 1, wherein the control parameter comprises an input value of a digital-to-analog converter, the peak control parameter value comprises the input value of the digital-to-analog converter enabling the modulation efficiency of the micro-ring modulator to reach the peak.

10. The method of claim 9, wherein the determining a correspondence between ambient temperatures of the micro-ring modulator and the peak control parameter values comprises:

generating a curve of input values of the digital-to-analog converter varying with the ambient temperature according to the ambient temperatures of the micro-ring modulator and the input values of the digital-to-analog converter enabling the modulation efficiency of the micro-ring modulator to reach the peak.

11. A control apparatus for a micro-ring modulator, comprising:

a memory having an executable program stored thereon;

at least one processor configured to call the executable program to perform the method of claim 1; and at least one I/O interface, connected between the processor and the memory, and configured to implement information interaction between the processor and the memory.

12. A control system for a micro-ring modulator, comprising:

the control apparatus for the micro-ring modulator of claim 11; and a temperature sensor configured to acquire an ambient temperature of at least one micro-ring modulator under a control of the control apparatus.

13. The control system of claim 12, further comprising:

an optical splitter configured to split an output optical signal modulated by the micro-ring modulator to obtain a detection optical signal; and an optical power detector configured to detect power of the output optical signal through the detection optical signal to obtain a detection electrical signal, and input the detection electrical signal to the control apparatus.

14. A non-transitory computer-readable medium having an executable program stored therein, the executable program, when executed, performs the method of claim 1.

15. A control method for a micro-ring modulator, comprising:

determining a current ambient temperature of at least one micro-ring modulator; and outputting a peak control parameter value of each micro-ring modulator corresponding to the current ambient temperature of the micro-ring modulator according to a pre-stored correspondence between ambient temperatures of the micro-ring modulator and peak control parameter values of the micro-ring modulator, to control modulation efficiency of the micro-ring modulator to reach a peak, wherein each peak control parameter value is a value of a control parameter enabling the modulation efficiency of the micro-ring modulator to reach the peak, and the control parameter is a temperature control parameter for controlling a temperature of the micro-ring modulator.

16. The method of claim 15, wherein the peak control parameter value comprises an input value of a digital-to-analog converter enabling the modulation efficiency of the micro-ring modulator to reach the peak.

17. The method of claim 16, wherein, for each micro-ring modulator, the correspondence between the ambient temperatures of the micro-ring modulator and the peak control parameter values comprises a curve of input values, varying with the ambient temperature, of the digital-to-analog converter enabling the modulation efficiency of the micro-ring modulator to reach the peak.

18. A control apparatus for a micro-ring modulator, comprising:

a memory having an executable program stored thereon;

at least one processor configured to call the executable program to perform the method of claim 15; and at least one I/O interface, connected between the processor and the memory, and configured to implement information interaction between the processor and the memory.

19. A control system for a micro-ring modulator, comprising:

the control apparatus for the micro-ring modulator of claim 18; and a temperature sensor configured to acquire an ambient temperature of at least one micro-ring modulator under a control of the control apparatus.

20. A non-transitory computer-readable medium having an executable program stored therein, the executable program, when executed, performs the method of claim 15.

* * * * *